(12) United States Patent
Glaser et al.

(10) Patent No.: US 9,008,130 B2
(45) Date of Patent: Apr. 14, 2015

(54) MANAGEMENT OF UNITS HOUSED IN SUBTENDED EQUIPMENT SHELVES

(75) Inventors: Donald J. Glaser, Huntington Beach, CA (US); Carl E. Gabrjelson, Jr., Santa Ana, CA (US); Ashraf Nisar, Rancho Santa Margarita, CA (US)

(73) Assignee: ADC DSL Systems, Inc., Berwyn, PA (US)

( * ) Notice: Subject to any disclaimer, the term of this patent is extended or adjusted under 35 U.S.C. 154(b) by 3833 days.

(21) Appl. No.: 10/641,675

(22) Filed: Aug. 15, 2003

(65) Prior Publication Data
US 2005/0036480 A1 Feb. 17, 2005

(51) Int. Cl.
H04J 3/02 (2006.01)
H04L 12/24 (2006.01)
H04J 3/12 (2006.01)

(52) U.S. Cl.
CPC . *H04L 41/00* (2013.01); *H04J 3/12* (2013.01); *H04L 12/24* (2013.01); *H04Q 2213/13003* (2013.01); *H04Q 2213/1301* (2013.01); *H04Q 2213/13036* (2013.01); *H04Q 2213/13141* (2013.01); *H04Q 2213/13292* (2013.01); *H04Q 2213/13336* (2013.01); *H04Q 2213/1334* (2013.01)

(58) Field of Classification Search
USPC ............ 370/364, 390, 421, 466, 487, 490, 370/532–541, 396; 398/43–57, 30, 181
See application file for complete search history.

(56) References Cited

U.S. PATENT DOCUMENTS

| | | | |
|---|---|---|---|
| 5,185,736 A * | 2/1993 | Tyrrell et al. | 370/358 |
| 5,355,362 A * | 10/1994 | Gorshe et al. | 370/222 |
| 5,440,564 A * | 8/1995 | Ovadia et al. | 370/358 |
| 5,608,720 A * | 3/1997 | Biegel et al. | 370/249 |
| 5,612,952 A * | 3/1997 | Motoyama | 370/412 |
| 5,706,280 A * | 1/1998 | Kosugi et al. | 370/244 |
| 5,953,318 A * | 9/1999 | Nattkemper et al. | 370/236 |
| 5,999,539 A * | 12/1999 | Dashiff et al. | 370/465 |
| 6,049,550 A * | 4/2000 | Baydar et al. | 370/466 |
| 6,137,800 A * | 10/2000 | Wiley et al. | 370/395.51 |
| 6,185,635 B1 * | 2/2001 | O'Loughlin et al. | 710/31 |
| 6,188,701 B1 * | 2/2001 | Tsukamoto et al. | 370/535 |
| 6,298,038 B1 * | 10/2001 | Martin et al. | 370/216 |

(Continued)

*Primary Examiner* — Christopher Grey
(74) *Attorney, Agent, or Firm* — Fogg & Powers LLC (57) ABSTRACT

A remote enclosure houses multiple subsystems. A first subsystem is coupled to a central office over a high-speed communication channel such as an OC-3 channel. The first subsystem extracts a downstream message from a first embedded operations channel included in the high-speed communication channel. The first subsystem also, when the downstream message is targeted to a first unit included in the first subsystem, forwards the message to a unit that processes the message for the first unit. When the message is not targeted to any unit included in the first subsystem, the first subsystem forwards the downstream message to another subsystem housed within the remote enclosure via a second embedded operations channel included in a second communication channel. The second subsystem is subtended from the first subsystem and is connected thereto by the second communication channel. In the upstream direction, the second subsystem sends an upstream message to the first subsystem over the second embedded operations channel. The first subsystem extracts the upstream message and transmits the upstream message on the first embedded operations channel.

7 Claims, 5 Drawing Sheets

(56) References Cited

U.S. PATENT DOCUMENTS

| | | | |
|---|---|---|---|
| 6,636,478 B1 * | 10/2003 | Sensel et al. | 370/216 |
| 6,807,190 B1 * | 10/2004 | Kremer | 370/452 |
| 6,891,851 B1 * | 5/2005 | Demakakos | 370/467 |
| 7,468,891 B2 * | 12/2008 | Lipski et al. | 361/679.01 |
| 2001/0024457 A1 * | 9/2001 | Barry et al. | 370/537 |
| 2001/0030979 A1 * | 10/2001 | Horachi | 370/535 |
| 2003/0095502 A1 * | 5/2003 | Glaser et al. | 370/228 |
| 2003/0169781 A1 * | 9/2003 | Duggan | 370/535 |

* cited by examiner

MANAGEMENT OF UNITS HOUSED IN SUBTENDED EQUIPMENT SHELVES

TECHNICAL FIELD

The following disclosure generally relates to telecommunications and more particularly to routing management messages in a remote enclosure.

BACKGROUND

One type of telecommunication service that a telecommunication service provider provides to a subscriber is DS-1 service (also referred to here as a "DS-1 line" or "T1 line"). One approach to providing DS-1 service to a subscriber is to provide DS-1 service over two twisted-pair telephone lines that run from a central office of the service provider directly to the subscriber's premise. This approach is not suitable, however for providing service to all subscribers.

Another approach to providing DS-1 service to subscribers (for example, subscribers located relatively far from the central office of the service provider) is to deploy a remote enclosure (also referred to as a "remote terminal" or "remote hut") in the outside plant. The outside plant is the portion of the service provider's network that is located outside of the central office. Multiple DS-1 lines are multiplexed together and communicated between the central office and the remote enclosure over a higher-speed communication channel (for example, a DS-3 channel or OC-3 channel). An appropriate communication medium or media is provided between the central office and the remote enclosure (for example, multiple twisted-pair telephone lines or one or more optical fibers). The higher-speed communication channel is carried over the communication medium.

In one configuration, multiple equipment shelves are housed within the remote enclosure, with each equipment shelf handling a subset of the DS-1 lines provided over the high-speed communications channel (for example, using appropriate DS-1 line interface units). In one such configuration, the shelves are arranged so that one shelf (referred to here as the "master" shelf) interfaces directly to the higher-speed communication channel (for example, via an appropriate multiplexer unit). The other shelves (referred to here as "subtended" shelves) are subtended from the master shelf. The master shelf splits the high-speed channel into the various subsets of DS-1 lines and routes one subset to the DS-1 line interface units housed within the master shelf. The other subsets are routed to respective subtended shelves for processing therein.

Service providers typically wish to manage such a remote enclosure remotely (that is, without requiring a technician to travel to the remote enclosure to configure and monitor the remote enclosure). One general approach to doing this involves embedding management and/or control messages (for example, TL-1 messages) into a higher-speed communication channel provided between the central office and the remote enclosure. However, where an OC-3 channel is provided between a central office and a remote enclosure that houses multiple equipment shelves arranged with one or more equipment shelves subtended from a master shelf, any management commands embedded in the OC-3 channel are typically terminated at the OC-3 multiplexer unit of the master equipment shelf. Consequently, management commands are typically not addressed to the DS-1 line interface units in the master equipment shelf nor to any units housed in the subtended equipment shelves. In such a configuration, the DS-1 line interfaces in the master equipment shelf and all the units in the subtended equipment shelves are typically not able to be remotely managed using such embedded management commands.

SUMMARY

In one embodiment, a method routes messages received at a first multiplexer from a first embedded operations channel. The method include extracting a message from the first embedded operations channel at the first multiplexer. The method also includes, when the message is targeted to a first unit associated with the first multiplexer, forwarding the message to a unit that processes the message for the first unit. The method also includes, when the message is not targeted to any unit associated with the first multiplexer, forwarding the message via a second embedded operations channel.

In another embodiment, a method routes messages to a first multiplexer from a second multiplexer subtended from the first multiplexer. A first embedded operations channel is coupled to the first multiplexer. A second embedded operations channel exists between the first multiplexer and the second multiplexer. The method includes extracting, at the first multiplexer, a message from the second embedded operations channel, wherein the message is transmitted from the second multiplexer. The method also includes transmitting the extracted message in the first embedded operations channel.

In another embodiment, a first multiplexer unit includes a first communications channel interface that, when the first multiplexer unit is coupled to a first communications channel, receives a first embedded operations channel from the first communications channel. The first multiplexer unit also includes a second communications channel interface that, when the first multiplexer unit is coupled a second communications channel, transmits on a second embedded operations channel included in the second communications channel. The first multiplexer unit extracts a message from the first embedded operation channel. The first multiplexer unit also, when the message is targeted to a first unit associated with the first multiplexer unit, forwards the message to a unit that processes the message for the first unit. The first multiplexer unit also, when the message is not targeted to any unit associated with the first multiplexer, forwards the message via a second embedded operations channel.

In another embodiment, a first multiplexer unit includes a first communications channel interface that, when the first multiplexer unit is coupled to a first communications channel, transmits on a first embedded operations channel included in the first communications channel. The first multiplexer unit also includes a second communications channel interface that, when the first multiplexer unit is coupled to a second multiplexer unit over a second communications channel, receives a second embedded operations channel from the second communications channel. The first multiplexer unit extracts a message from the second embedded operations channel, wherein the message is transmitted from the second multiplexer unit. The first multiplexer unit also transmits the extracted message in the first embedded operations channel.

In another embodiment, an OC-3 multiplexer unit includes an OC-3 interface that, when the OC-3 multiplexer unit is coupled to an OC-3 channel, receives a first data communications channel included in the OC-3 channel. The OC-3 multiplexer unit also includes a STS-1 interface that, when the OC-3 multiplexer unit is coupled to a STS-1 channel, transmits on a second data communications channel included in the STS-1 channel. The OC-3 multiplexer unit also includes an OC-3 processing subsystem that extracts a message from the first data communications channel. The OC-3 processing subsystem also, when the message is targeted to a DS-1 line interface unit associated with the OC-3 multiplexer, forwards the message to a shelf controller unit that processes the message for the DS-1 line interface unit. The OC-3 processing subsystem also, when the message is not targeted to any unit associated with the first multiplexer, forwards the message to the STS-1 multiplexer unit via the second data communications channel.

In another embodiment, an OC-3 multiplexer unit includes an OC-3 interface that, when the OC-3 multiplexer unit is coupled to an OC-3 channel, transmits on a first data communications channel included in the OC-3 channel. The OC-3 multiplexer unit also includes a STS-1 interface that, when the OC-3 multiplexer unit is coupled to a STS-1 channel, receives a second data communications channel included in the STS-1 channel. The OC-3 multiplexer unit also includes an OC-3 processing subsystem that extracts a message from the second data communications channel, wherein the message is transmitted from the second multiplexer unit. The OC-3 processing subsystem also transmits the extracted message in the first data communications channel.

In another embodiment, a system includes a master shelf that houses an OC-3 multiplexer unit, a first plurality of DS-1 line interface units, and a master shelf controller unit. The OC-3 multiplexer unit, the first plurality of DS-1 line interface units, and the master shelf controller unit communicate over a master backplane included in the master shelf. The system further includes at least one subtended shelf that houses a STS-1 multiplexer unit, a second plurality of DS-1 line interface units, and a subtended shelf controller unit. The STS-1 multiplexer unit, the second plurality of DS-1 line interface units, and the subtended shelf controller unit communicate over a subtended backplane included in the subtended shelf. The OC-3 multiplexer unit is coupled to the STS-1 multiplexer unit over a STS-1 communications channel. The OC-3 multiplexer unit includes an OC-3 interface that, when the OC-3 multiplexer unit is coupled to an OC-3 communications channel, receives OC-3 signals from the OC-3 communications channel. The OC-3 multiplexer unit also includes a STS-1 interface that transmits STS-1 signals on the STS-1 channel. The OC-3 multiplexer unit also includes an OC-3 processing subsystem that extracts a message from an OC-3 data communications channel included in the OC-3 communications channel. The OC-3 processing subsystem also, when the message is targeted to one of the first plurality of DS-1 line interface units, forwards the message to the master shelf controller unit. The OC-3 processing subsystem also, when the message is not targeted to any unit housed in the master shelf, forwards the message to the STS-1 multiplexer unit via a STS-1 data communications channel included in the STS-1 communications channel.

In another embodiment, a system includes a master shelf that houses an OC-3 multiplexer unit, a first plurality of DS-1 line interface units, and a master shelf controller unit. The OC-3 multiplexer unit, the first plurality of DS-1 line interface units, and the master shelf controller unit communicate over a master backplane included in the master shelf. The system also includes at least one subtended shelf that houses a STS-1 multiplexer unit, a second plurality of DS-1 line interface units, and a subtended shelf controller unit. The STS-1 multiplexer unit, the second plurality of DS-1 line interface units, and the subtended shelf controller unit communicate over a subtended backplane included in the subtended shelf. The OC-3 multiplexer unit is coupled to the STS-1 multiplexer unit over a STS-1 communications channel. The OC-3 multiplexer unit includes an OC-3 interface that, when the OC-3 multiplexer unit is coupled to an OC-3 communications channel, transmits OC-3 signals on the OC-3 communications channel. The OC-3 multiplexer unit also includes a STS-1 interface that receives STS-1 signals from the STS-1 channel. The OC-3 multiplexer unit also includes an OC-3 processing subsystem that extracts a message from a STS-1 data communications channel included in the STS-1 communications channel, wherein the message is transmitted from the second multiplexer unit. The OC-3 processing subsystem transmits the extracted message in an OC-3 data communications channel included in the OC-3 communications channel.

In another embodiment, a method routes messages in a remote enclosure coupled to a central office over a first communication channel having a first embedded operations channel. The method includes extracting a message, at a first subsystem housed within the remote enclosure, from the first embedded operations channel. The method also includes, when the message is targeted to a first unit included in the first subsystem, forwarding the message to a unit included in the first subsystem that processes the message for the first unit. The method also includes, when the message is not targeted to any unit included in the first subsystem, forwarding the message to a second subsystem housed within the remote enclosure via a second embedded operations channel.

In another embodiment, a method routes messages in a remote enclosure coupled to a central office over a first communication channel having a first embedded operations channel. The method includes extracting, at a first subsystem housed in the remote enclosure, a message from a second embedded operations channel that couples the first subsystem to a second subsystem housed within the remote enclosure. The method also includes transmitting the extracted message in the first embedded operations channel.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
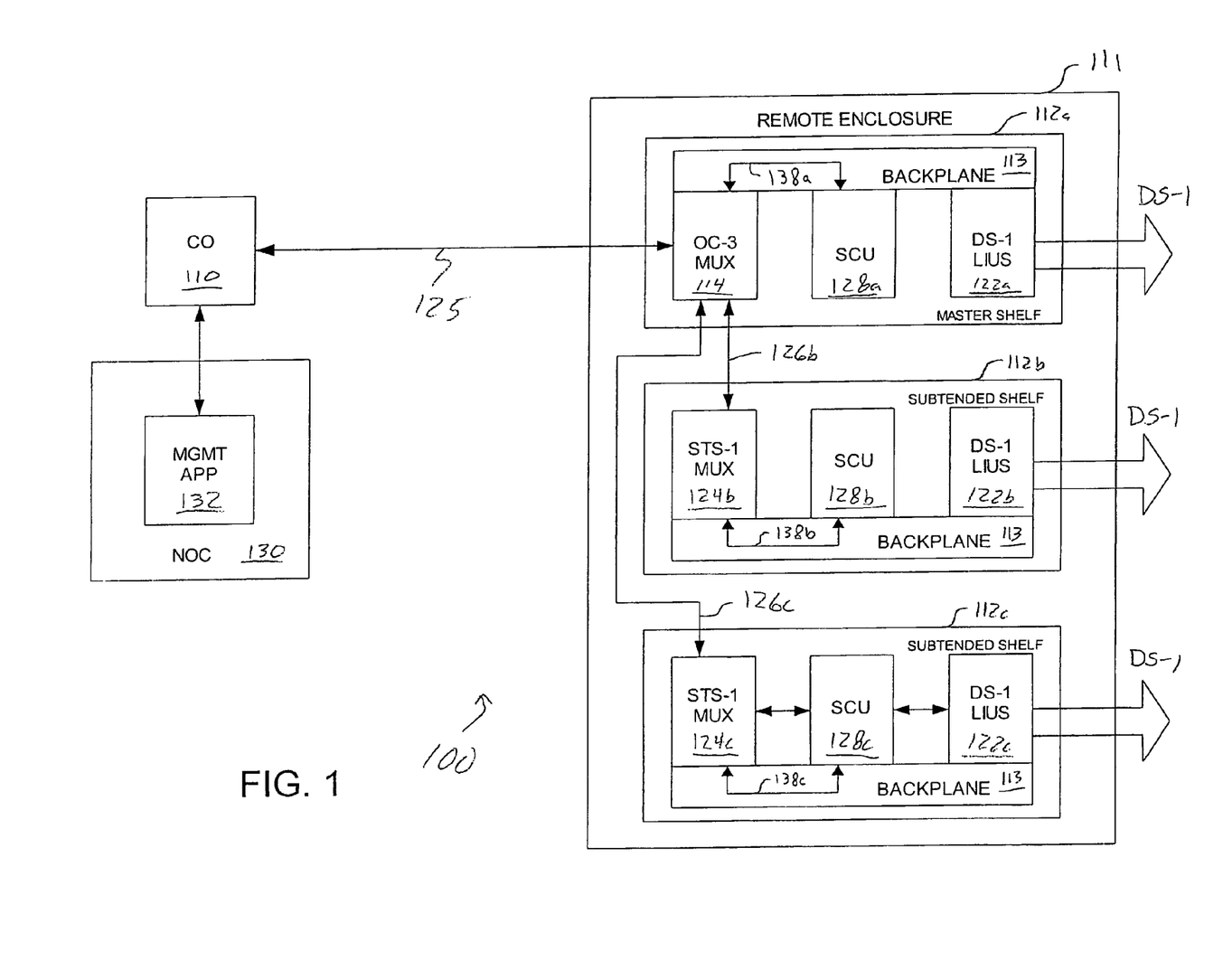
FIG. 1 is a block diagram of one embodiment of a network.

FIG. 1 is a block diagram of one embodiment of a network 100. In the embodiment shown in FIG. 1, network 100 includes a central office 110 that communicates with a remote enclosure 111 over an OC-3 channel 125. The OC-3 channel 125 is provided between the central office 110 and the remote enclosure 111 over an appropriate communication medium (for example, one or more optical cables).

In the embodiment shown in FIG. 1, three equipment shelves 112a, 112b, and 112c are housed within the remote enclosure 111. The functional units described here are housed within the shelves 112a, 112b, and 112c and communicate with other units housed within the same shelf over respective backplanes 113a, 113b, and 113c. In the embodiment shown in FIG. 1, one equipment shelf 112a (referred to here as the "master equipment shelf" or the "master shelf" 112a) includes an OC-3 multiplexer unit 114 that interfaces directly to the OC-3 communication channel 125. The master shelf 112a also includes multiple DS-1 line interface units (collectively shown in FIG. 1 with block 122a). In one embodiment, the line interface units 122 include up to 28 HDSLx line interface units, where each HDSLx line interface unit provides a DS-1 line to customer premise equipment (not shown) over one or more twisted-pair telephone lines (not shown). As used herein, "HDSLx" refers to any of the high speed digital subscriber line technologies that are used to provide one or more DS-1 channels to a subscriber over one or more twisted-pair telephone lines.

The two other equipment shelves 112b and 112c (referred to here as the "subtended equipment shelves" or "subtended shelves 112b and 112c) are subtended from the master equipment shelf 112a. Each of the subtended equipment shelves 112b and 112c includes an STS-1 multiplexer unit 124b and 124c, respectively, that couples the respective subtended shelves 112b and 112c to the OC-3 multiplexer unit 114 of the master shelf 112a over respective STS-1 channels 126b and 126c. In one such embodiment, the STS-1 channels 126b and 126c are provided over a coaxial cable. Each of the subtended shelves 112b and 112c includes multiple DS-1 line interface units (collectively shown in FIG. 1 with blocks 122b and 122c, respectively). In one embodiment, the multiple line interface units 122b and 122c include up to 28 HDSLx line interface units, where each HDSLx line interface unit provides a DS-1 line to customer premise equipment (not shown) over one or more twisted-pair telephone lines (not shown).

In the downstream direction from the central office 110 to the remote enclosure 111, the OC-3 multiplexer unit 114 demultiplexes the OC-3 channel 125 received from the communication medium into three subsets of DS-1 channels. Each subset includes 28 DS-1 channels. The OC-3 multiplexer unit 114 takes the first subset of 28 DS-1 channels and further demultiplexes the subset into 28 DS-1 channels. Each DS-1 channel is provided to one of the line interface unit 122a of the master shelf 112a in order to provide DS-1 service to customer premise equipment coupled to that line interface unit 122a. The OC-3 multiplexer unit 114 routes the second and third subsets of 28 DS-1 channels to the STS-1 multiplexer units 124b and 124c, respectively, of the respective subtended shelves 112b and 112c over the STS-1 channels 126b and 126c.

The STS-1 multiplexer unit 124b takes the second subset of 28 DS-1 channels and further demultiplexes the second subset into 28 DS-1 channels. Each DS-1 channel is provided to one of the line interface units 122b of the subtended shelf 112b in order to provide DS-1 service to customer premise equipment coupled to that line interface unit 122b. Likewise, the STS-1 multiplexer unit 124c takes the third subset of 28 DS-1 channels and further demultiplexes the third subset into 28 DS-1 channels. Each DS-1 channel is provided to one of the line interface units 122c of the subtended shelf 112c in order to provide DS-1 service to customer premise equipment coupled to that line interface unit 122c.

In the upstream direction from the remote enclosure 111 to the central office 110, upstream DS-1 traffic is received from the customer premise equipment coupled to the line interface units 122a, 122b, and 122c of the shelves 112a, 112b, and 122c. The STS-1 multiplexer units 124b and 124c multiplex the 28 DS-1 channels from the respective line interface units 122b and 122c into upstream STS-1 streams transmitted to the OC-3 multiplexer unit 114 over the respective STS-1 channels 126b and 126c. The OC-3 multiplexer unit 114 multiplexes the 28 DS-1 channels from the line interface units 122a and the upstream STS-1 streams provided on the STS-1 channels 126b and 126c into an upstream OC-3 stream. The upstream OC-3 stream is transmitted to the central office 110 over the OC-3 channel 125.

The shelves 112a, 112b, and 112c include shelf controller units 128a, 128b, and 128c, respectively. The shelf controller units 128a, 128b, and 128c monitor and control the operation of the various units housed in the respective shelves 112a, 112b, and 112c. The shelf controller units 128a, 128b, and 128c communicate with the various units housed in the respective shelves 112a, 112b, and 112c over, for example, the respective backplanes 113a, 113b, and 113c of the shelves 112a, 112b, and 112c. In particular, the OC-3 multiplexer unit 114 communicates with the shelf controller unit (SCU) 128a over a two-wire, RS-232 serial link 138a that is formed in the backplane 113a of the shelf 112a. Similarly, the STS-1 multiplexer units 126b and 126c communicate with the shelf controller unit 128b and 128c, respectively, over two-wire, RS-232 serial links 138b and 138c, respectively, formed in the backplane 113b and 113c of the shelves 112b and 112c.

In the embodiment shown in FIG. 1, a technician located in a network operation center (NOC) 130 monitors, configures, and controls the operation of the shelves 112a, 112b, and 112c and the line interface units 122a, 122b, and 122c housed therein via a management application 132. Management commands are communicated between the management application 132 and the remote enclosure 111 using an embedded operations channel included in the OC-3 channel 125. The embedded operations channel, in the embodiment shown in FIG. 1, is the data communications channel (DCC) provided in the section overhead of the OC-3 channel 125. In one such embodiment, the DCC is transported in the D1, D2, and D3 bytes of the section overhead of the STS-3 signal (more specifically, in the D1, D2, and D3 bits of the section overhead of STS-1 signal number 1 in the STS-3 signal). This DCC (bits D1-D3) forms a 192 kilobit per second (kbs) channel for transmission of operations, administration, maintenance, and provisioning messages.

Figure 2:
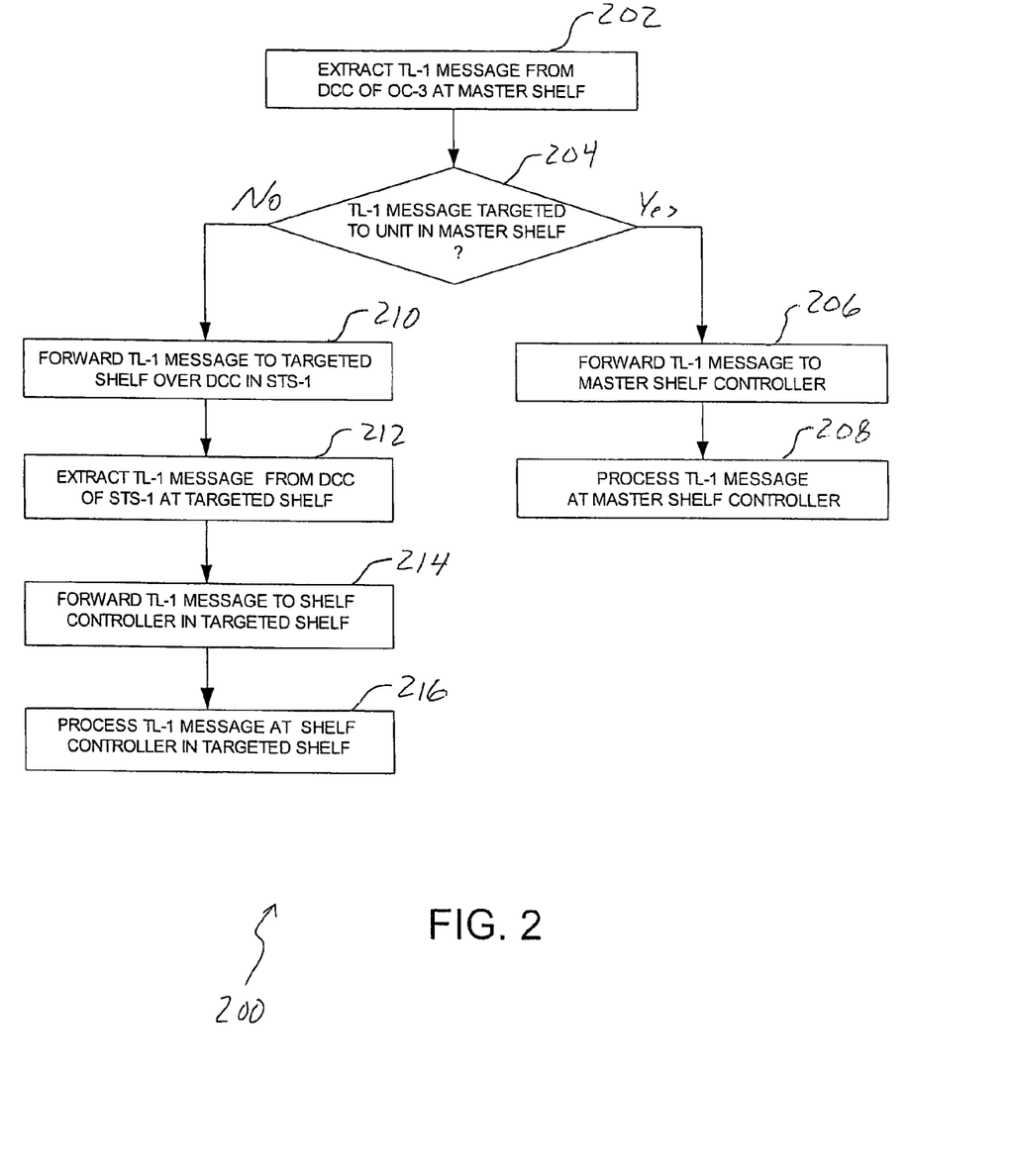
FIG. 2 is a flow chart of one embodiment of a method of routing messages from an embedded operation channel of an OC-3 communications channel in a downstream direction.

FIG. 2 is a flow chart of one embodiment of a method 200 of routing messages from an embedded operation channel (for example, a DCC) of an OC-3 communications channel 125 in a downstream direction. The embodiment of method 200 shown in FIG. 2 is implemented using the remote enclosure 111 (and equipment shelves 112a, 112b, and 112c housed therein). In this embodiment, the embedded operations channel (EOC) messages include transaction language 1 (TL-1) messages used to monitor, configure, and control units housed within the equipment shelves (for example, the DS-1 line interface units 122a, 122b, and 122c and the DS-1 lines provided thereby).

Method 200 includes extracting, at the master shelf 112a, a TL-1 message from the DCC of the OC-3 channel 125 (block 202). For example, the OC-3 multiplexer unit 114 in the master shelf 112a extracts the TL-1 message from the DCC. The OC-3 multiplexer unit 114 operates a DCC protocol stack that is used to extract and process the TL-1 messages from the DCC. If the extracted TL-1 message is targeted to a unit housed in the master shelf 112a (referred to here as the "targeted unit") (checked in block 204), the extracted TL-1 message is forwarded to the shelf controller unit 128a in the master shelf 112a for processing (block 206). In other words, the TL-1 message is forwarded to a unit that processes such messages for the targeted unit. The shelf controller unit 128*a* processes the TL-1 message as appropriate (block 208).

In the embodiment shown in FIG. 2, the TL-1 message is forwarded from the OC-3 multiplexer unit 114 to the shelf controller unit 128*a* over the RS-232 link 138*a*. In this embodiment, the shelf controller unit 128*a* processes and responds to the TL-1 message for other units (for example, one of the DS-1 line interface units 122*a*). In such an embodiment, the DCC protocol stack executing on OC-3 multiplexer unit 114 implements, for example, the target identifier address resolution protocol (TARP) in order to route TL-1 messages to the appropriate unit based on a target identifier (TID) included in the TL-1 message. In such an embodiment, for example, appropriate routing tables are created in order to route the TL-1 messages based on such a TID.

If the extracted TL-1 message is not targeted to a unit housed in the master shelf 112*a*, the TL-1 message is targeted to a unit housed in one of the subtended shelves 112*b* and 112*c*. The shelf to which the TL-1 message is targeted is referred to here as the "targeted shelf." The TL-1 message, in such a situation, is forwarded to the targeted shelf over an embedded operations channel included in the STS-1 channel (channel 126*b* or 126*c*) between the master shelf 112*a* and the targeted shelf (either 112*b* or 112*c*) (block 210). In the embodiment shown in FIG. 2, the TL-1 message is forwarded to the targeted shelf over the DCC channel (bytes D1, D2, and D3) of the STS-1 channel 126*b* or 126*c*.

The forwarded TL-1 message is extracted from the STS-1 channel 126*b* or 126*c* by the STS-1 multiplexing unit 124*b* or 124*c* of the targeted shelf 112*b* or 112*c* (block 212). The extracted TL-1 message is forwarded to the shelf controller unit 128*b* or 128*c* in the targeted subtended shelf 112*b* or 112*c* for processing (block 214). In other words, the TL-1 message is forwarded to a unit that processes such messages for the targeted unit. The targeted subtended shelf controller unit 128*b* or 128*c* processes the TL-1 message as appropriate (block 216).

In the embodiment shown in FIG. 2, the TL-1 message is forwarded from the STS-1 multiplexer unit 124*b* or 124*c* to the shelf controller unit 128*b* or 128*c* over the RS-232 link 138*b* or 138*c*. In this embodiment, the shelf controller unit 128*b* or 128*c* processes and responds to the TL-1 message for other units (for example, one of the DS-1 line interface units 122*b* or 122*c*). In such an embodiment, the STS-1 multiplexer units 124*b* and 124*c* execute a DCC protocol stack in order to extract, process, and route TL-1 messages.

Figure 3:
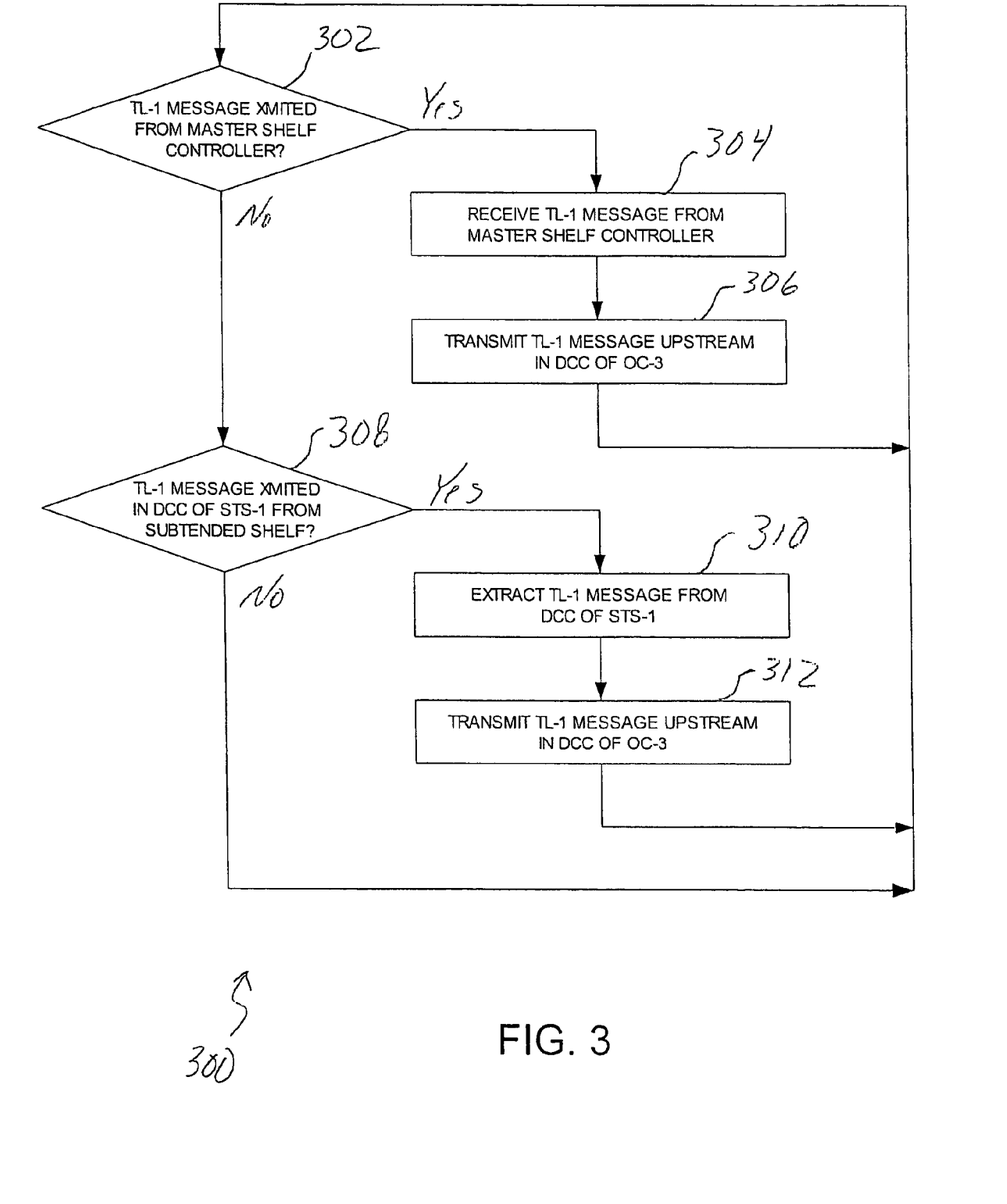
FIG. 3 is a flow chart of one embodiment of a method of routing messages to an embedded operation channel of an OC-3 communications channel in an upstream direction.

FIG. 3 is a flow chart of one embodiment of a method 300 of routing messages to an embedded operation channel (for example, a DCC) of an OC-3 communications channel 125 in an upstream direction. The embodiment of method 300 shown in FIG. 3 is implemented using the remote enclosure 111 (and equipment shelves 112*a*, 112*b*, and 112*c* housed therein). In this embodiment, the embedded operations channel (EOC) messages include transaction language 1 (TL-1) messages used to monitor, configure, and control units housed within the equipment shelves (for example, the DS-1 line interface units 122*a*, 122*b*, and 122*c* and the DS-1 lines provided thereby).

When an upstream TL-1 message is transmitted from the shelf controller unit 128*a* of the master shelf 112*a* to the OC-3 multiplexer unit 114 (checked in block 302), the OC-3 multiplexer unit 114 receives the upstream TL-1 message (block 304). The OC-3 multiplexer unit 114 transmits the received upstream TL-1 message upstream in the DCC of the OC-3 channel 125 (block 306). For example, the upstream TL-1 message from the shelf controller unit 128*a* is received over the RS-232 link 138*a*. In such an embodiment, the shelf controller unit 128*a* processes upstream TL-1 messages that relate to units housed within the master shelf 112*a*. For example, the shelf controller unit 128*a* processes upstream TL-1 messages that relate to the DS-1 line interface units 122*a*. The shelf controller unit 128*a*, in such an embodiment, communicates with the various DS-1 line interface unit 122*a* over the backplane 113*a* to get relevant information for the upstream TL-1 messages. The shelf controller unit 128*a* formats the TL-1 message for transmission upstream and sends the upstream TL-1 message to the OC-3 multiplexer unit 114 over the RS-232 link 138*a*. The OC-3 multiplexer unit 114 receives the upstream TL-1 message. In such an embodiment, the OC-3 multiplexer unit 114 operates a DCC protocol stack that is used to process and transmit the upstream TL-1 message on the DCC of OC-3 channel 125.

When an upstream TL-1 message is transmitted from one of the subtended shelves 112*b* or 112*c* to the OC-3 multiplexer 114 (checked in the block 308), the OC-3 multiplexer unit 114 extracts the TL-1 message from the DCC of the STS-1 channel 126*b* or 126*c* over which the TL-1 message is transmitted (block 310). In such an embodiment, the shelf controller unit 128*b* and 128*c* in the subtended shelves 112*b* and 112*c* processes upstream TL-1 messages that relate to units housed within the shelves 112*b* and 112*c*, respectively. For example, the shelf controller unit 128*b* processes upstream TL-1 messages that relate to the DS-1 line interface units 122*b*. The shelf controller units 128*b* and 128*c*, in such an embodiment, communicate with the various DS-1 line interface units 122*b* and 122*c*, respectively, over the backplanes 113*b* and 113*c* of the respective shelves 112*b* and 112*c* to get relevant information for the upstream TL-1 messages. The shelf controller units 128*b* and 128*c* format the TL-1 messages for transmission upstream and send the upstream TL-1 messages to the respective STS-1 multiplexer units 124*b* and 124*c* over RS-232 link 138*b* and 138*c*, respectively. In such an embodiment, the STS-1 multiplexer units 124*b* and 124*c* operate a DCC protocol stack that is used to process and transmit the upstream TL-1 message on the DCC of STS-1 channels 126*b* and 126*c*, respectively. A DCC protocol stack operating on the OC-3 multiplexing unit 114 extracts the TL-1 messages from the STS-1 channel 126*b* or 126*c* over which the TL-1 message is transmitted from the subtended shelf 112*b* or 112*c*.

The OC-3 multiplexer unit 114 transmits the extracted upstream TL-1 message upstream in the DCC of the OC-3 channel 125 (block 312). A DCC protocol stack operating on the OC-3 multiplexer 114 is used to process and transmit the extracted upstream TL-1 message on the DCC of the OC-3 channel 125. In one such embodiment, the DCC protocol stack that extracts the upstream TL-1 message is the same DCC protocol stack that processes and transmits the extracted TL-1 message on the DCC of the OC-3 channel 125. In another such embodiment, separate DCC protocol stacks are used.

Embodiments of method 200 and 300 are used to allow management messages, such as TL-1 messages, to be communicated between a management application 132 and each of the shelf controller units 128*a*, 128*b*, and 128*c* over the OC-3 channel 125 even though the OC-3 channel 125 is terminated at the master shelf 112*a*. This allows a technician located in a network operations center 130 of a service provider to remotely monitor, configure and control units housed within the shelves 112*a*, 112*b*, and 112*c*. Moreover, such embodiments allow TL-1 messages that are sent to and received from the subtended shelves 112*b* and 112*c* to be communicated from and to the master shelf 112*a* over the main data STS-1 channels 126*b* and 126*c*, which obviates the need to provide other communication channels for communicating such TL-1 messages among the shelves 112a, 112b, and 112c.

Figure 4:
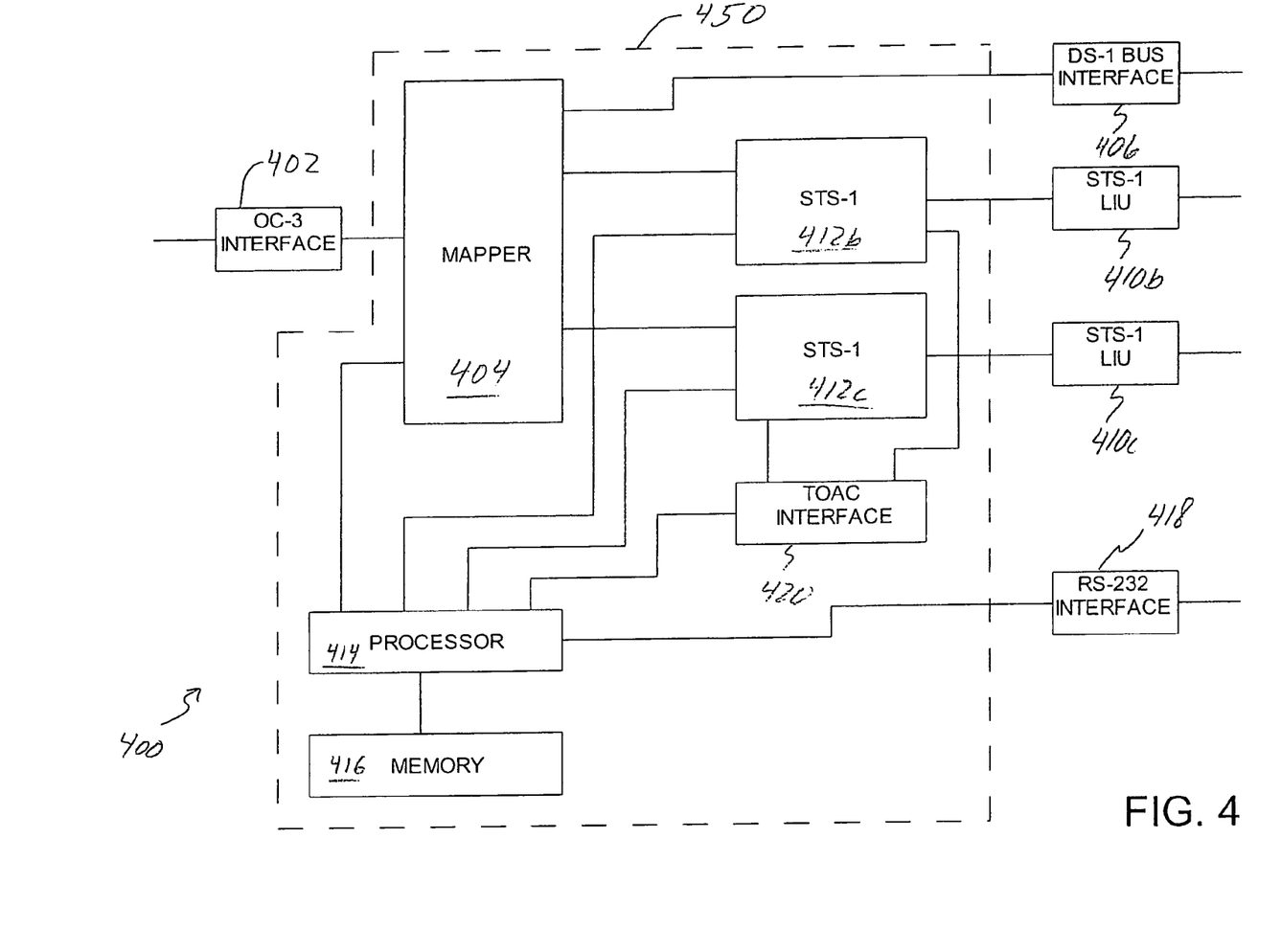
FIG. 4 is a block diagram of one embodiment of an OC-3 multiplexer unit.

FIG. 4 is a block diagram of one embodiment of an OC-3 multiplexer unit 400. Embodiments of OC-3 multiplexer unit 400 are suitable for use as the OC-3 multiplexer 114 shown in FIG. 1. The embodiment shown in FIG. 4 is described here as being implemented for use in embodiment of a remote enclosure 111 shown in FIG. 1, though it is to be understood that other embodiments are implemented in other ways. OC-3 multiplexer unit 400 includes an OC-3 interface 402 that includes a transceiver (not shown) that provides an interface to the optical communication medium to which the OC-3 multiplexer unit 400 is coupled during operation. The OC-3 interface 402 receives an optical downstream STS-3 signal from the optical communication medium and outputs an electrical downstream STS-3 signal to the mapper 404. The OC-3 interface 402 receives an electrical upstream STS-3 signal from the mapper 404 and outputs an optical upstream STS-3 signal on the optical communication medium.

The mapper 404, in the downstream direction, receives the downstream STS-3 signal from the OC-3 interface 402 and demultiplexes the downstream STS-3 signal into three STS-1 signal groups. One STS-1 signal group is output as 28 DS-1 signals to a DS-1 bus interface 406. The DS-1 bus interface 406 couples the 28 DS-1 signals to respective DS-1 line interface units 122a over one or more time division multiplexing (TDM) buses provided over the backplane 113a of the master shelf 112a into which the OC-3 multiplexer unit 400 is inserted. In one embodiment, the TDM bus that is used to couple the DS-1 bus interface 406 to the DS-1 line interface units 122a includes 7 independent DS-2 buses, where each DS-2 bus couples each of 4 DS-1 line interface units to one of 4 DS-1 signals.

The two other STS-1 signal groups are output by the mapper 404 as two STS-1 channels 408a and 408b that are used to communicate with two subtended equipment shelves 112b and 112c that are connected to the OC-3 multiplexer unit 400 via STS-1 line interface units 410b and 410c included in OC-3 multiplexer unit 400. Each of the STS-1 channels 408a and 408b are processed by STS-1 interfaces 412b and 412c, respectively, before the STS-1 channels 408b and 408c are sent out on the STS-1 line interface units 410a and 410b to the respective subtended shelves 112b and 112c coupled thereto. The STS-1 interfaces 412b and 412c are provided in those embodiments where the mapper 404 is unable (or is otherwise not configured) to embedded and extract the DCC from the STS-1 channels 408b and 408c in addition to embedding and extracting the DCC of the OC-3 channel. For example, in one such embodiment, the mapper 404 is implemented using an ULTRAMAPPERLITE OC-3 mapper from Agere Systems, Inc. In other embodiments, the functionality provided by the STS-1 interfaces 412b and 412c are included in the mapper 404 or similar device.

The OC-3 multiplexer unit 400 also includes a processor 414 that monitors and controls the operations of the OC-3 multiplexer unit 400. The processor 414 is coupled to one or more types of memory 416, in which program instructions and data are stored. Some of the functions described here are implemented, in whole or in part, by programming the processor 414 with suitable program instructions that, when executed by the processor 414, cause the OC-3 multiplexer unit 400 to execute such functions. In one embodiment, the processor 414 includes a MPC860T microprocessor from Motorola, Inc.

In one embodiment, the functionality of the STS-1 interfaces 410b and 410c, the RS-232 interface 418 (described below), and the TOAC interface 420 (described below) are implemented together in a single field programmable gate array (FPGA). In other embodiments, such functionality is implemented in other ways. The mapper 404, the STS-1 interfaces 412b and 412c, the processor 414, memory 416, and TOAC interface 420 form one embodiment of an OC-3 processing subsystem 450.

Embodiments of OC-3 multiplexer unit 400 are suitable for use in implementing embodiments of methods 200 and 300 shown in FIGS. 2 and 3. For example, in one such embodiment, an embodiment of OC-3 multiplexer unit 400 is included in a master shelf 112a and is coupled to the OC-3 channel 125. In such an embodiment, in the downstream direction, the mapper 404 receives the downstream OC-3 (STS-3) signal from the OC-3 module 402 and terminates the section overhead of the OC-3 channel 125. As a part of this, the mapper 404 retrieves the DCC bytes from the section overhead of the OC-3 channel 125. In one such embodiment, the bytes D1, D2, and D3 are retrieved from the section overhead of the OC-3 channel 125. The retrieved bytes are sent to the processor 414. A DCC protocol stack is executed on the processor 414. The DCC protocol stack processes the DCC bytes and extracts TL-1 messages (and/or other types of messages or commands) that are embedded in the DCC.

The DCC protocol stack determines to which unit each TL-1 message is addressed. This is done, in one embodiment, using a TID included in the TL-1 message and, for example, TARP functionality included in the DCC protocol stack. If an extracted TL-1 message is targeted to a unit enclosed within the master shelf 112a (that is, the shelf in which the OC-3 multiplexer unit 400 is housed), the TL-1 message is forwarded to the shelf controller unit 128a in the master shelf 112a. In this embodiment, the shelf controller unit 128a is the unit in the master shelf 112a that processes TL-1 messages targeted to units housed within the master shelf 112a. For example, a TL-1 message may be addressed to one of 28 DS-1 line interface units 122a housed in the master shelf 112a. The embodiment of an OC-3 multiplexer unit 400 shown in FIG. 4 includes a RS-232 interface 418 so that such a TL-1 message can be sent from the mapper 404 to the shelf controller unit 128a over a RS-232 serial communication link 138a formed, for example, in the backplane of the master shelf 112a. The shelf controller unit 128a receives the TL-1 message and processes it appropriately.

If the extracted TL-1 message is not targeted to a unit housed in the master shelf 112a, the TL-1 message is targeted to a unit housed in one of the subtended shelves 112b and 112c. In such a situation, the DCC protocol stack forwards the TL-1 message to the targeted shelf over the DCC included in the STS-1 channel 126b or 126c between the master shelf 112a and the subtended target shelf (either 112b or 112c). One of the STS-1 interfaces 412b or 412c provides the physical layer processing for inserting the TL-1 message into the DCC of the STS-1 channel 126b or 126c. In one such embodiment, the DCC channel includes bytes D1, D2, and D3 of the section overhead of the STS-1 channels 126b and 126c. The forwarded TL-1 message is extracted from the STS-1 channel 126b or 126c by the STS-1 multiplexing unit 124b or 124c of the targeted subtended shelf 112b or 112c. The extracted TL-1 message is forwarded to the shelf controller unit 128b or 128c in the targeted shelf 112b or 112c for processing, which processes the TL-1 message as appropriate.

In such an embodiment, in the upstream direction, when an upstream TL-1 message is transmitted from the shelf controller unit 128a of the master shelf 112a to the OC-3 multiplexer unit 114 over the RS-232 link 138a, the upstream TL-1 message (for example, a TL-1 message relating to one of the DS-1 line interface units 122a housed in the master shelf 112a) is received by the processor 414 of the OC-3 multiplexer unit 400 via the RS-232 interface 418. The DCC protocol stack executing on the processor 414 determines that the upstream TL-1 message is addressed to an upstream network element (for example, a management application 132) and forwards the TL-1 message to the mapper 404, which embeds the TL-1 message in the DCC channel of the OC-3 channel 125 for transmission upstream. The embodiment of an OC-3 multiplexer unit 400 shown in FIG. 4 includes a transport overhead access channel (TOAC) interface 420 that is used by the processor 414 to forward such TL-1 messages to the mapper 404 for embedding in the DCC channel of the OC-3 channel 125.

When an upstream TL-1 message is transmitted from one of the subtended shelves 112b or 112c to the OC-3 multiplexer 114, the STS-1 interface 412b or 412c receives the STS-1 channel 126b or 126c via the STS-1 line interface 410b or 410c. The STS-1 interface 412b or 412c extracts the DCC bytes from the STS-1 channel 126b or 126c and passes the DCC bytes to the DCC protocol stack executing on the processor 414. The DCC protocol stack then extracts the upstream TL-1 message and determines that the TL-1 message is addressed to an upstream network element (for example, management application 132). The DCC protocol stack forwards the TL-1 message (for example, via TOAC interface 420) to the mapper 404, which embeds the TL-1 message in the DCC channel of the OC-3 channel 125 for transmission upstream.

Figure 5:
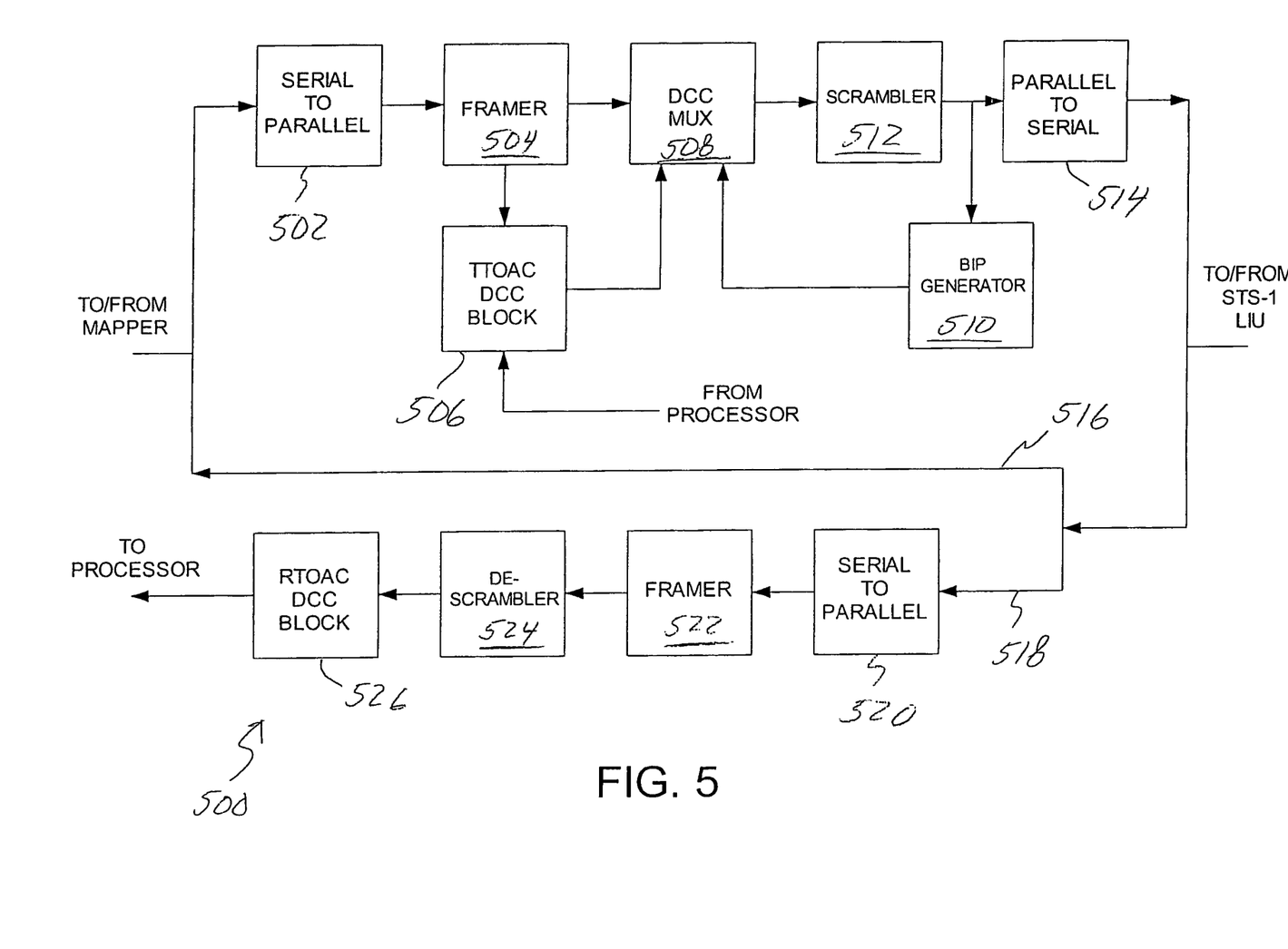
FIG. 5 is a block diagram of one embodiment of an STS-1 interface.

FIG. 5 is a block diagram of one embodiment of an STS-1 interface 500. Embodiments of STS-1 interface 500 are suitable for use in embodiments of the OC-3 multiplexer unit 400 described above in connection with FIG. 4. In particular, embodiments of STS-1 interface 500 are suitable for use in those embodiments where the mapper 404 is unable (or is otherwise not configured) to embedded and extract the DCC from the STS-1 channels 408b and 408c in addition to embedding and extracting the DCC of the OC-3 channel. The embodiment shown in FIG. 5 is described here as being implemented for use in embodiment of a remote enclosure 111 shown in FIG. 1, though it is to be understood that other embodiments are implemented in other ways.

STS-1 interface 500 includes a downstream serial-to-parallel converter 502 that converts the downstream STS-1 signal received from the mapper 404 from a serial signal to a 8-bit wide parallel signal. The output of the serial-to-parallel converter 502 is supplied to a downstream framer 504, which interprets and extracts the STS-1 frames included in the parallel signal output by the serial-to-parallel converter 502. In particular, the downstream framer 504 extracts the DCC portion of the section overhead (referred to here as the "original DCC overhead") from STS-1 frames and supplies the original DCC overhead to a transmit transport overhead access channel (TTOAC) DCC block 506.

The TTOAC DCC block 506 receives DCC bytes (for example, bytes D1, D2, and D3) from the DCC protocol stack executing on the processor 414. The DCC bytes are received over a serial line. The received DCC bytes are inserted into the original DCC overhead extracted by the downstream framer 504. The resulting DCC overhead (containing the DCC bytes from the DCC protocol stack) (referred to here as the "updated DCC overhead") is supplied to a DCC multiplexer 508 which inserts the updated DCC overhead into the STS-1 frame from which the corresponding original DCC overhead was extracted. In the embodiment shown in FIG. 5, the DCC multiplexer 508 also inserts into the section overhead of appropriate STS-1 frames a bit interleaved parity (BIP-8) byte generated by a BIP generator 510 based on the output of a scrambler 512 (described below).

The resulting STS-1 frame with the updated section overhead (referred to here as an "updated STS-1 frame") is output to the scrambler 510 that, if the STS-1 interface 500 is so configured (for example, via an appropriate control signal or register), scrambles the resulting updated STS-1 frame. The output of the scrambler 512 is supplied to a downstream parallel-to-serial converter 514 that converts the 8-bit STS-1 frame signal into a serial line for transmission on a STS-1 line interface unit 410b or 410c. In other words, in the downstream direction, the STS-1 interface 500 updates the section overhead of the downstream STS-1 frames output by the mapper 404 with DCC bytes from the DCC protocol stack executing on the processor 414.

In the upstream direction, the serial upstream STS-1 signal received from the STS-1 line interface unit 410b or 410c is split into two signal paths 516 and 518. The first signal path 516 provides the serial upstream STS-1 signal, in unmodified form, to the mapper 404 for appropriate processing to include the upstream STS-1 signal in the upstream OC-3 channel 125. In the other signal path 518, the serial upstream STS-1 signal is processed so as to extract the relevant DCC information and supply it to the DCC protocol stack executing on the processor 414. In such an embodiment, the DCC protocol stack will process the extracted DCC information. As described above, the DCC protocol stack uses the TOAC interface 420 to supply DCC bytes (for example, DCC bytes that contain TL-1 messages) to mapper 404 for inclusion in the DCC included in the section overhead of the OC-3 channel 125.

In signal path 518, an upstream serial-to-parallel converter 520 converts the serial upstream STS-1 signal received from an STS-1 line interface unit 410b or 410c into an 8-bit wide parallel upstream STS-1 signal. This signal is output to an upstream framer 522 that outputs STS-1 frames based on the parallel STS-1 signal output by the serial-to-parallel converter 520. The output of the upstream framer 522 is supplied to descrambler 524 that, if necessary, descrambles STS-1 frames. The output of the descrambler 524 is supplied to a receive transport overhead access channel (RTOAC) DCC block 526. The RTOAC DCC block 526 extracts the DCC from the section overhead included in the STS-1 frames and supplies the extracted DCC to the DCC protocol stack executing on the processor 414 for processing as described above. The extracted DCC bytes are processed by the DCC protocol stack executing on the processor 414 and the processor 414 and the DCC protocol stack uses the TOAC interface 420 to supply DCC bytes to mapper 404 for inclusion in the DCC included in the section overhead of the OC-3 channel 125.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of routing messages to a first multiplexer from a second multiplexer subtended from the first multiplexer, wherein a first embedded operations channel is coupled to the first multiplexer and a second embedded operations channel exists between the first multiplexer and the second multiplexer, the method comprising:

extracting, at the first multiplexer, a message from the second embedded operations channel, wherein the message is transmitted from the second multiplexer; and transmitting the extracted message in the first embedded operations channel.

2. The method of claim 1, wherein the first embedded operations channel is a data communications channel included in section overhead of an OC-3 channel.

3. The method of claim 1, wherein the second embedded operations channel is a data communications channel included in section overhead of an STS-1 channel.

4. The method of claim 1, wherein the first multiplexer is housed within a first equipment shelf.

5. The method of claim 1, wherein a data communications channel protocol stack is used to extract the message.

6. The method of claim 1, wherein the message is a TL-1 message.

7. The method of claim 1, wherein the second multiplexer is housed with a second shelf and the message relates to a line interface unit housed within the second shelf.

* * * * *